United States Patent
Stellari et al.

(10) Patent No.: US 11,715,195 B2
(45) Date of Patent: Aug. 1, 2023

(54) MACHINE LEARNING-BASED CIRCUIT BOARD INSPECTION

(71) Applicant: International Business Machines Corporation, Armonk, NY (US)

(72) Inventors: Franco Stellari, Waldwick, NJ (US); Peilin Song, Lagrangeville, NY (US); Cyril Cabral, Jr., Yorktown Heights, NY (US); Steven G. Shevach, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 17/208,346

(22) Filed: Mar. 22, 2021

(65) Prior Publication Data
US 2022/0301134 A1     Sep. 22, 2022

(51) Int. Cl.
| | |
|---|---|
| *G06T 11/60* | (2006.01) |
| *G06T 7/00* | (2017.01) |
| *G06T 7/33* | (2017.01) |
| *G01N 21/359* | (2014.01) |
| *G01N 21/88* | (2006.01) |
| *G06N 20/00* | (2019.01) |

(52) U.S. Cl.
CPC ........... *G06T 7/001* (2013.01); *G01N 21/359* (2013.01); *G01N 21/8851* (2013.01); *G06N 20/00* (2019.01); *G06T 7/337* (2017.01); *G01N 2021/8887* (2013.01); *G06T 2207/10048* (2013.01); *G06T 2207/20081* (2013.01); *G06T 2207/30141* (2013.01)

(58) Field of Classification Search
CPC ......... G06T 7/00; G06T 7/337; G06T 7/0008; G06N 20/00; B25J 13/087; B25J 9/1697; G06F 16/9024; H04L 41/509; H04L 41/5048
See application file for complete search history.

(56) References Cited

U.S. PATENT DOCUMENTS

| | | | |
|---|---|---|---|
| 5,775,806 A | 7/1998 | Allred | |
| 8,106,946 B2 | 1/2012 | Yan | |
| 8,310,668 B2 | 11/2012 | Ihara | |
| 9,497,394 B2 | 11/2016 | Xin | |
| 2003/0059103 A1 | 3/2003 | Shiomi | |
| 2004/0010444 A1* | 1/2004 | Delorme | G01R 31/281 |
| | | | 702/183 |
| 2021/0150742 A1* | 5/2021 | Sato | G01C 3/06 |

FOREIGN PATENT DOCUMENTS

| | | |
|---|---|---|
| CA | 2363171 A1 | 5/2003 |
| EP | 0467149 B1 | 4/1997 |

OTHER PUBLICATIONS

Lu et al., "FICS-PCB: A Multi-Modal Image Dataset for Automated Printed Circuit Board Visual Inspection", Cryptology ePrint Archive: Report 2020/366, last revised Apr. 7, 2020, 8 pages.

Mell et al., "The NIST Definition of Cloud Computing", Recommendations of the National Institute of Standards and Technology, Special Publication 800-145, Sep. 2011, 7 pages.

* cited by examiner

*Primary Examiner* — Phuoc H Doan
(74) *Attorney, Agent, or Firm* — David K. Mattheis

(57) ABSTRACT

Circuit board inspection by receiving a near infrared (NIR) image of at least a portion of a circuit board, analyzing the NIR image using a machine learning model, and detecting anomalous circuit board portions according to the analysis.

17 Claims, 5 Drawing Sheets

MACHINE LEARNING-BASED CIRCUIT BOARD INSPECTION

This invention was made with government support under Contract FA8650-18-F-1656 ATC-TSS-DTE awarded by the U.S. Air Force, Office of Scientific Research. The government has certain rights to this invention.

FIELD OF THE INVENTION

The disclosure relates generally to the machine learning-based inspection of printed circuit board assemblies. The disclosure relates particularly to machine learning-based inspection of circuit board assemblies using infrared radiation

BACKGROUND

Inspection of circuit boards before and after assembly of electronic components is an important step to guarantee that the boards and assemblies fall inside specification limits, adhere to tolerances, and match the design. Circuit boards may be inspected after manufacturing and after assembly to check that all interconnects have been formed properly. After assembly, the circuit boards may be inspected to make sure that all the components have been placed correctly and no damage has been done to the board. It is often useful to be able to quickly inspect and reverse engineer a board to detect intellectual property infringement or to detect the presence of malicious components for security applications.

Typically, two main types of inspections are performed. Visible light inspection using fast acquisition cameras or human eye enable the inspection of components types, some soldering joints, as well as exterior labels and top interconnects. This approach is usually fast and allows for the inspection of a large number of boards in a routine process. Time consuming 2D and 3D x-ray tomography may image all layers of the boards, and most types of solder joints. This process may be limited to few samples (usually known failing samples or samples for critical applications).

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable circuit board inspection using infrared (IR) images.

Aspects of the invention disclose methods, systems and computer readable media associated with circuit board inspection by receiving a near infrared (NIR) image of at least a portion of a circuit board, analyzing the NIR image using a machine learning model, and detecting anomalous circuit board portions using the analysis.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
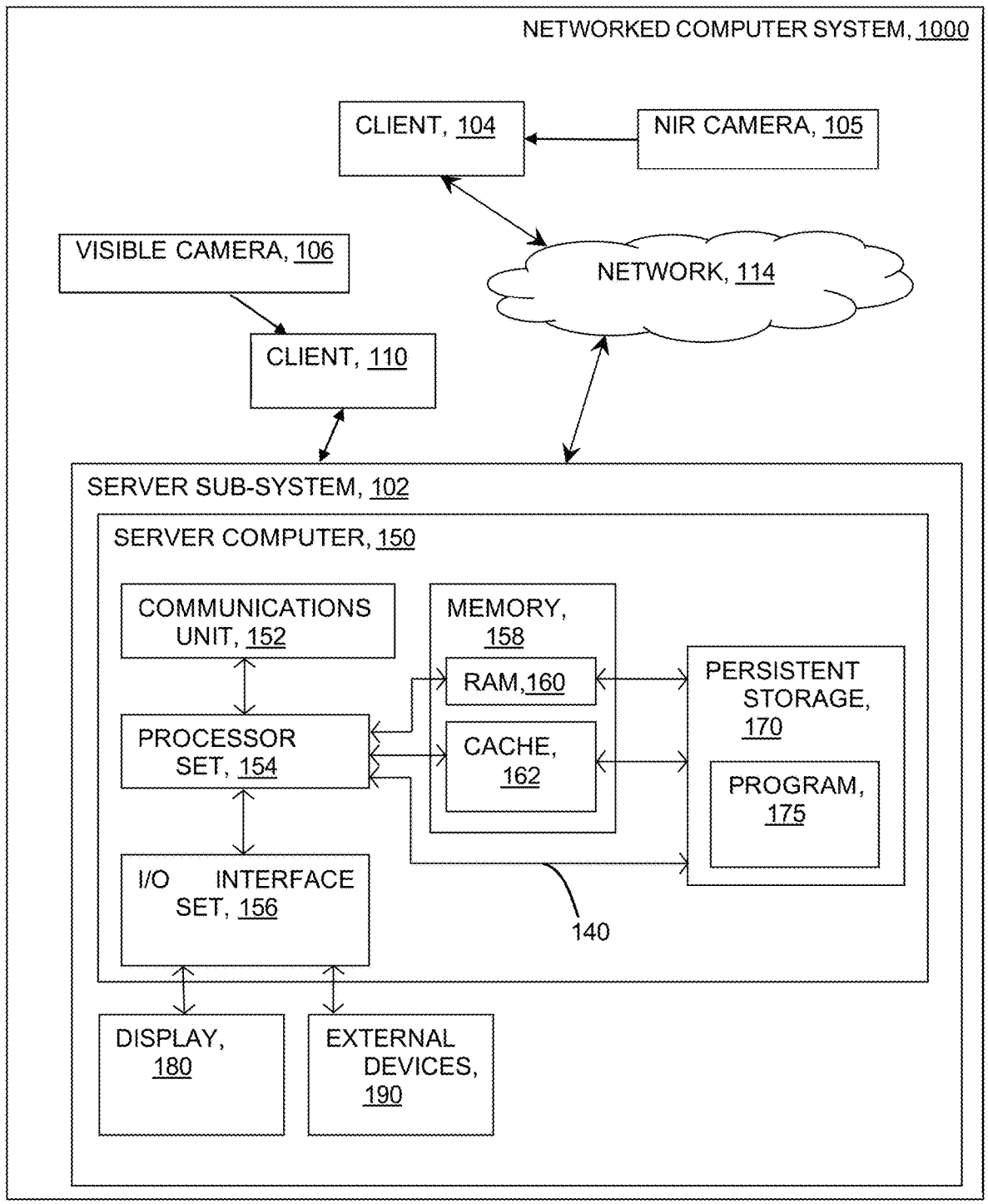
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As used herein, the terms "board", and "circuit board" means a printed circuit board at any stage of assembly, including during fabrication, after fabrication and before the addition of surface mount components, as well as after the addition of surface mount components to reach the final assembly.

Using Near Infrared (NIR) illumination and cameras (e.g., InGaAs cameras) allows an inspection to capture images from deeper within the board. A visible light image acquired with a visible light camera captures surface features of the board, component type and placement, labels, etc. A NIR image acquired using a NIR illumination (in the 1 um to 2 um wavelength range) and an InGaAs camera sensitive in the 0.9-1.7 µm (micrometers) spectral range captures metal interconnect features from one or more layers inside the board.

The visible light image captures better information regarding the board's surface features (such as board labels, component details, and part labels) but does not include significant information about the board traces. On the other hand, the NIR image captures a much more contrasted and better-quality image including the metal interconnects of the board. The NIR image captures interconnect layers that are beneath the surface of the board. Compared to x-ray imaging, the cost and acquisition time are much lower using NIR imaging.

The NIR image captures some internal metal interconnects but the interconnects towards the center layers of the board may not be discernible in the NIR image. An NIR image further enables viewing of chip components within de-encapsulated chips, which are not captured or discernible in visible light images. Disclosed embodiments enable the use of NIR imaging, separately and in combination with visible light imaging to enhance circuit board inspections and reduce any need for x-ray imaging of boards.

In an embodiment, one or more components of the system can employ hardware and/or software to solve problems that are highly technical in nature (e.g., receiving a near infrared (NIR) image of at least a portion of a circuit board, analyzing the NIR image using a machine learning model, detecting anomalous circuit board portions according to the analysis, etc.). These solutions are not abstract and cannot be performed as a set of mental acts by a human due to the processing capabilities needed to facilitate circuit board inspections, for example. Further, some of the processes performed may be performed by a specialized computer for carrying out defined tasks related to infrared inspection of circuit boards. For example, a specialized computer can be employed to carry out tasks related to the inspection of circuit boards using infrared detection, or the like.

In an embodiment, a system for inspecting circuit boards includes an image capture sensor such as a camera, having a sensor configured to capture near infrared capture data and images. NIR images include images associated with electromagnetic radiation having wavelengths in the 0.9-1.7 µm spectral range, rather than the typical visible wavelength range of 0.38-0.7 µm. The sensor may incorporate magnification elements enabling the capture of magnified portions of circuit board samples. In this embodiment, the sensor captures a set of images covering a plurality of respective portions of the sample circuit board as part of the inspection of the circuit board. The system may further comprise one or more infrared illumination sources emitting radiation in the same spectral range as the sensor to provide additional IR radiation to be reflected and otherwise scattered by the sample board and subsequently captured by the sensor.

In this embodiment, the system passes NIR images captured by the sensor to a processor, or networked computing environment, for analysis. The analysis includes identifying metal interconnects and other elements of the sample circuit board from the images. The system processing and analysis includes the use of machine vision algorithms including machine learning (ML) models for simple pattern recognition of expected metal interconnects and other elements, as well as the identification of unexpected metal interconnects or other components, using machine learning models. The vision systems including ML models extract metal interconnect features from the NIR images according to contrast levels between portions of the images. The presence of high contrast changes from one portion of an image to an adjacent portion of the image may indicate an edge of a feature such as a metal interconnect. The use of the NIR sensor enables the visualization of edges and associated features beneath the surface of the sample circuit board.

In an embodiment, the system compares images of circuit board portions with a standard, baseline, model, or ideal image associated with each respective circuit board portion. The method derives such images from the design criteria for the board. The machine learning model identifies elements of the captured NIR image which differ from the baseline image, as well as identifying expected baseline image features absent from the captured NIR image.

In an embodiment, the system compares captured NIR image data to an average NIR image. In this embodiment, the method compiles an average NIR image by combining images from a plurality of sample circuit boards. In an embodiment, the system conducts pixel level comparisons of the baseline data and the captured image. In an embodiment, the system subtracts one of the baseline image or the average image from the captured image, or subtracts the captured image from the baseline or average image, and analyzes the remaining image portions. In an embodiment, the system compiles a dataset of acceptable and unacceptable images for each portion of the sample circuit board using NIR images captured from preciously inspected circuit boards. Previous boards having known defects provide a source for unacceptable NIR image portions. Defect-free boards provide a source for acceptable NIR images and acceptable pixel and vector data, for the respective board portions.

In an embodiment, the system converts image data to a vector representation for each portion of the circuit board and compares the captured vector representation for a portion or sub-portion to a corresponding standard, or baseline, or average vector, for the portion. The system identifies portions of the sample being inspected having a data vector differing from the baseline, or average vector.

In an embodiment, the system determines vector similarities or differences according to a similarity between board portion or feature vectors. Examples of methods of determining the similarity of the vectors include Jaccard distance, Cosine distance, Euclidean distance, between vectors of a pair. A person of ordinary skill in the art may apply other techniques of determining similarity between vector pairings of image feature vectors other than those presented, herein, and not deviate from, or limit the features of embodiments of the present invention.

In an embodiment, the method compares components recognized within the NIR image with a standard bill of material for the inspected board. The system checks for the presence of all bill of material components. The system further checks to ensure that there are no extra elements, present within the image and absent from the bill of material. In this embodiment, the method utilizes pattern data from the baseline or average image data in recognizing board elements.

In an embodiment, the system maintains a compiled data record of identified differences for each board as a set of anomalous board portions or sub-portions for each inspected board. The system compiles a listing of identified anomalous elements, those which differ as well as any missing elements. In this embodiment, the system associates the listing for each sample board with the sample board through a serialized indicium disposed upon and associated with each sample circuit board.

In an embodiment, the anomalous elements of a board include assembly errors wherein an incorrect component has been disposed upon a board, or a correct component has been improperly placed upon the board, such as by being rotated from a nominal or correct orientation. Anomalous elements may also include superfluous components, those components present upon the board but absent from a bill of material for the board. Anomalous elements may further include metal interconnect elements which are defective—incomplete traces, or metal interconnects absent from the design criteria, baseline image, average image, of a baseline set of vector data, for the board. In an embodiment, such an extra metal interconnect indicates a malicious circuit added to circumvent device or system security measures through additional circuitry upon the board.

In an embodiment, the system provides an output report detailing the identified anomalies of each inspected board, according to the serialized indicium of each board.

In an embodiment, the system further comprises a second image sensor, such as a second camera configured to capture visible light images of the circuit board. In this embodiment, the second camera may also be configured with magnification elements and/or lighting elements enabling the capture of magnified portions of the circuit board. The NIR senor and the visible light sensor may be configured to capture sets of images of inspected circuit boards, where the set of visible images and the set of NIR images correspond to identical portions of the inspected circuit boards. In this embodiment, precision board staging elements move each inspected circuit board in a defined pattern with respect to the field of view of the sensors. Precise staging of the boards enables the capture of NIR and visible images of identical portions of each board. In an embodiment, the system captures each of the NIR and visible images at identical levels of magnification, such that the pairs of images have the same scale. In an embodiment, the system captures the NIR and visible images at differing magnifications. For the NIR and visible images having differing magnifications, the system uses registration techniques and algorithms to scale one image to match the other image magnification and field of view.

In an embodiment, the system comprises additional sensors such as ultrasonic sensors and/or thermal sensors having a broader spectral sensitivity in the IR portion of the electromagnetic spectrum.

In an embodiment, pairs of NIR and visible images for each board portion are registered to each either using common board elements discernible in each image of the pair. In this embodiment, trained pattern recognition models register the pairs of images enabling precise overlays, or combination of the pairs of images to yield an augmented image including board elements captured in the visible spectrum as well as those elements captured in the NIR spectrum. As used herein, registration refers to processes for the alignment of multiple different images to a common coordinate system, yielding images considered to be registered to each other.

In an embodiment, the system extracts surface features from the visible images of the board portions. Features such as the visible appearance of each component and any labels or other visible indicia disposed upon the board or the respective board components. The system uses machine learning pattern matching (classification) models to identify surface features. The method identifies anomalous surface features through the comparison to baseline or average data files for the board as described above for the NIR data. In an embodiment, the method compares pixel data associated with the baseline or average image with the captured image. In an embodiment, the system compares vector translations of the baseline or average and captured visible data.

In an embodiment, the system tracks and compiles the anomalous visible features in addition to the anomalous NIR features for each board. In this embodiment, the system provides an output report of the set of anomalous features, r indicating the absence of any anomalous features.

In an embodiment, combining the registered visible and NIR images enables the identification of scenarios wherein a surface mounted component blocks or obstructs the NIR view of an internal metal interconnection of the board. In this embodiment, the method identifies the metal interconnect portions from the NIR data and the blocking, or obstructing, component from the visible data. The system must then infer or interpolate the portion of the metal interconnect rendered invisible to the NIR by the blocking component.

In an embodiment, the system addresses the issue of blocked metal interconnect features by providing the combination of visible feature data and NIR data as inputs to a generative adversarial network (GAN). In this embodiment, the GAN training and testing data sets includes images or data associated with circuit boards prior to the installation of the blocking component(s). Such images include actual NIR data associated with those metal interconnects partially obscured in the assembled circuit boards. In this embodiment, GAN training and testing data may further include images associated with different interconnect configurations associated with a single common surface mount component, and/or x-ray tomography data associated with meta interconnects underlying specific surface mount components which block NIR visibility to underlying interconnects. The GAN generates one or more interconnect paths for the blocked portion and the system integrates the generated metal interconnect data to the combination of the NIR and visible image data yielding a composite visible, NIR, and generated data image illustrating the predicted interconnect paths. In this embodiment. In an embodiment, the GAN generates a set of possible interconnect paths, each path of the set including a confidence level of the GAN that the path is the correct path associated with the identified surface mount component. In this embodiment, the system generates differing composite images, each composite image having a confidence level associated with generated data integrated into the composite image. The system analyzes each composite image for anomalous features as described above.

In an embodiment, the system makes inferences associated with possible metal interconnects otherwise blocked by surface mount components, using a set of deep neural network (DNN) machine learning models. In this embodiment, the method uses a first DNN model to identify potential blocking components in the visible light image of the circuit board portion, based upon the pin configuration, size and shape of the visible components. A second DNN model identifies the type/model of the identified blocking component from a set of known components provided as the training data set for the second DNN model. A third DNN model, trained upon the specific features, such as pin type, pin assignments, design configuration rules, etc., of the components of the training data set of the second DNN, determines a probability of an actual metal interconnect connection between the interconnect portions visible in the NIR data under the visible blocking component. For example, where the third DNN predicts a high probability (>50%) the system generates and integrates the predicted connection as generated data, into the NIR and/or NIR plus visible data images. The integrated images are then used as described above to identify for the inspection to identify anomalous board features. For instances having a low probability of a connection between the NIR visible portions under the blocking component, the system identifies the blocked feature as a suspicious anomaly. In an embodiment, the system recommends further investigation of the suspicious anomaly.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise board inspection program (not shown) together with sufficient computing resource (processor, memory, network communications hardware) to execute the program. Client devices 104 and 110 include processors receiving data from image acquisition elements such as NIR 105 and visible light 106 cameras, as well as user interface processors enabling user access to inspection results and recommendations.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the circuit board inspection program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., circuit board inspection program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
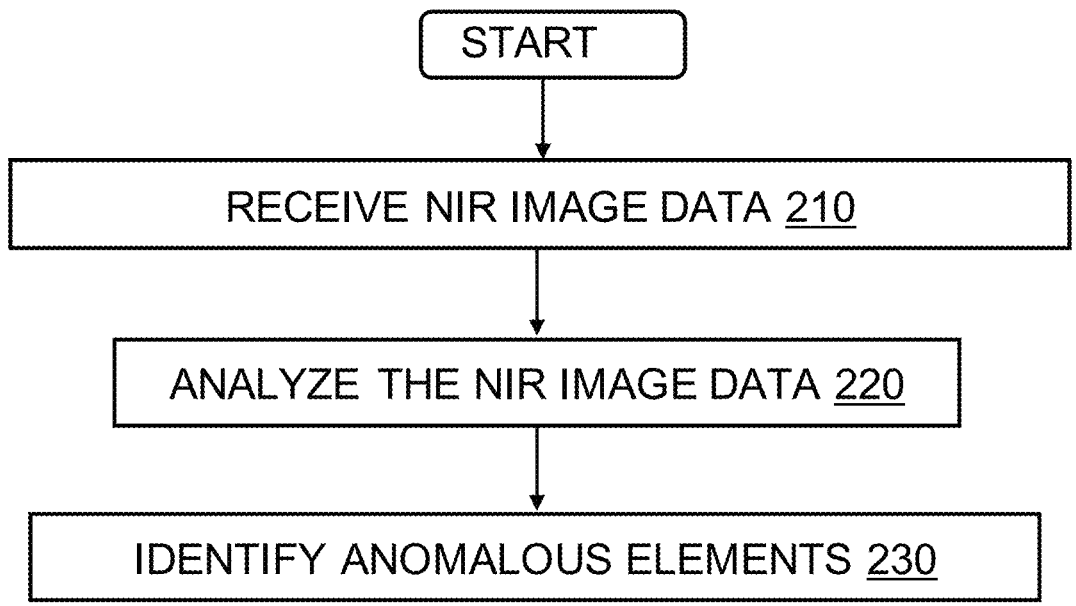
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of circuit board inspection program 175 receives NIR image data for at least a portion of a circuit board. The image data may arise from one or more NIR image sensors alone or in combination with NIR magnification and lighting elements. In an embodiment, the method further receives visible image data for the same portion of the circuit board from a visible image sensor alone or in combination with appropriate magnification and lighting system. Additional sensors, such as a broad IR spectrum thermal sensor may further provide data to the method. The system may provide pre-registered images, due to the configuration and apparatus used in acquiring the NIR, visible, and other images. For unregistered images, the method registers the images using a machine learning model to identify common features enabling registration of the multiple images to a common frame of reference or coordinate system.

At block 220, the method of circuit board inspection program 175, analyzes the NIR image data using one or more machine learning models. In an embodiment, the method uses a matching (classification) model to classify the data according to the model network weights derived from the patterns of data from the training and testing data sets of the model. In an embodiment, the method compares the captured image to a baseline image or an average image, to identify anomalous board elements. In an embodiment, the method subtracts one image, such as a baseline image, from the new captured image, and analyzes the result. In an embodiment, the method compares image pixel data for each sub portion of the captured image and the baseline or average image. In an embodiment, the method translates each of the baseline or average images, as well as the captured image, into feature vectors and compares the relevant feature vectors of each of the respective images to identify anomalous features at block 230. The method translates identified anomalous feature vectors back to board features to report out the anomalous features identified.

In an embodiment, the method combines the registered visible and NIR images yielding a composite image including both visible surface features and sub-surface features from the NIR images. In this embodiment, the method analyzes the composite image to identify anomalous elements using the methods described above with respect to the NIR image data. In this embodiment, the method further extracts visible surface features from the composite image using classification or other pattern matching models. In this embodiment, the method compares extracted surface features with elements disclosed on a bill of material for the inspected board to ensure that all required elements are present and properly placed and that no extra, superfluous or malicious components are present upon the inspected board.

In an embodiment, the method provides an output data file including the anomalous elements identified for each inspected board/assembly. For each anomalous element identified, the method provides an indication of the nature of the anomaly as well as indications of missing elements, poorly or improperly placed elements, incomplete or otherwise defective metal interconnects, suspicious elements, or metal interconnects, etc. In an embodiment, the method compares the identified anomalous features for each inspected board with user defined thresholds for the board. In this embodiment, the user defined thresholds provide indication regarding the severity of possible identified anomalous elements. Some elements may carry a fatal defect characterization indicating that the identification of the defect must result in rejection of the board. Some elements may be redundant elements of the design, such that the method identifies and reports a defect in an element of a set of redundant elements, but the defect does not result in a rejection of the board or assembly. Other anomalous elements may trigger a need for further inspections, such as x-ray inspection of the identified anomaly. In this embodiment, the method appends the identified anomalous features report for the inspected boards with the defined threshold analysis for the identified elements.

Figure 3:
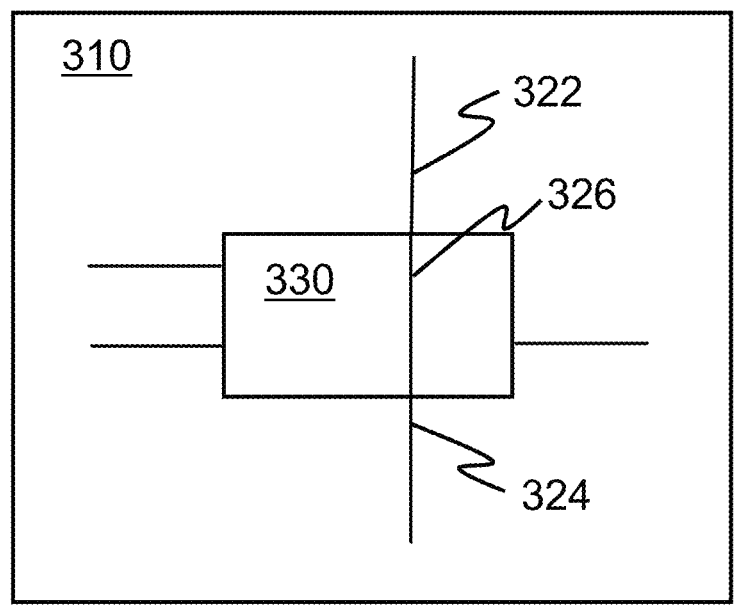
FIG. 3 depicts a circuit board portion subject to inspection and machine learning inferences, according to an embodiment of the invention.

FIG. 3 provides a schematic illustration 300 of a portion 310 of a circuit board. The portion 310 includes metal interconnect traces 322 and 324 acquired using NIR image data, as well as blocking component 330, acquired from the visible image data of the inspection system. In an embodiment, a GAN, or other ML model, generates otherwise blocked metal interconnect portion 326 and integrates portion 326 into the image with the NIR and visible image data.

In an embodiment, the computing environment supporting implementation of the invention incorporate edge cloud, and/or cloud computing resources connected to local computing resources through network connections, as described above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
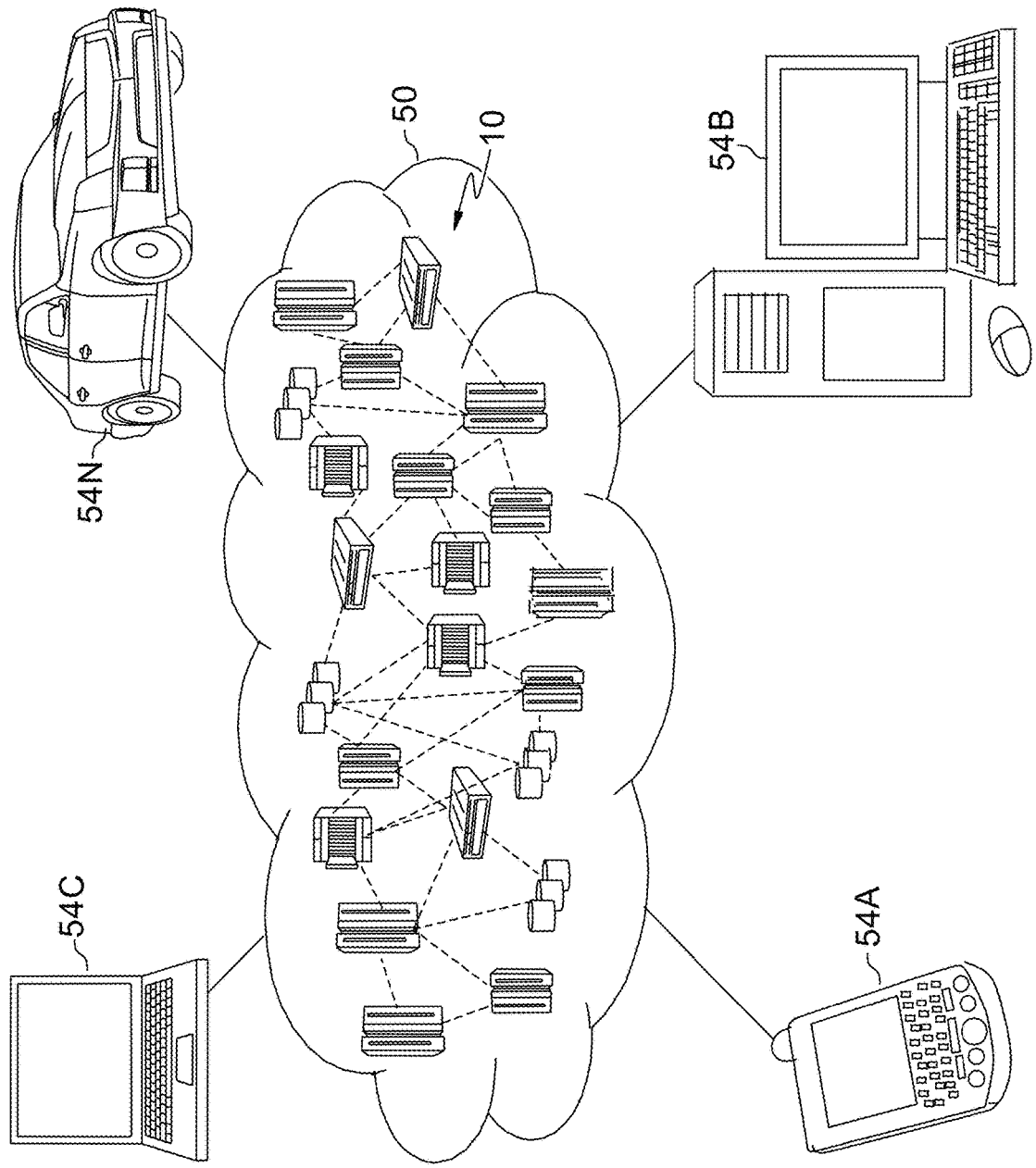
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
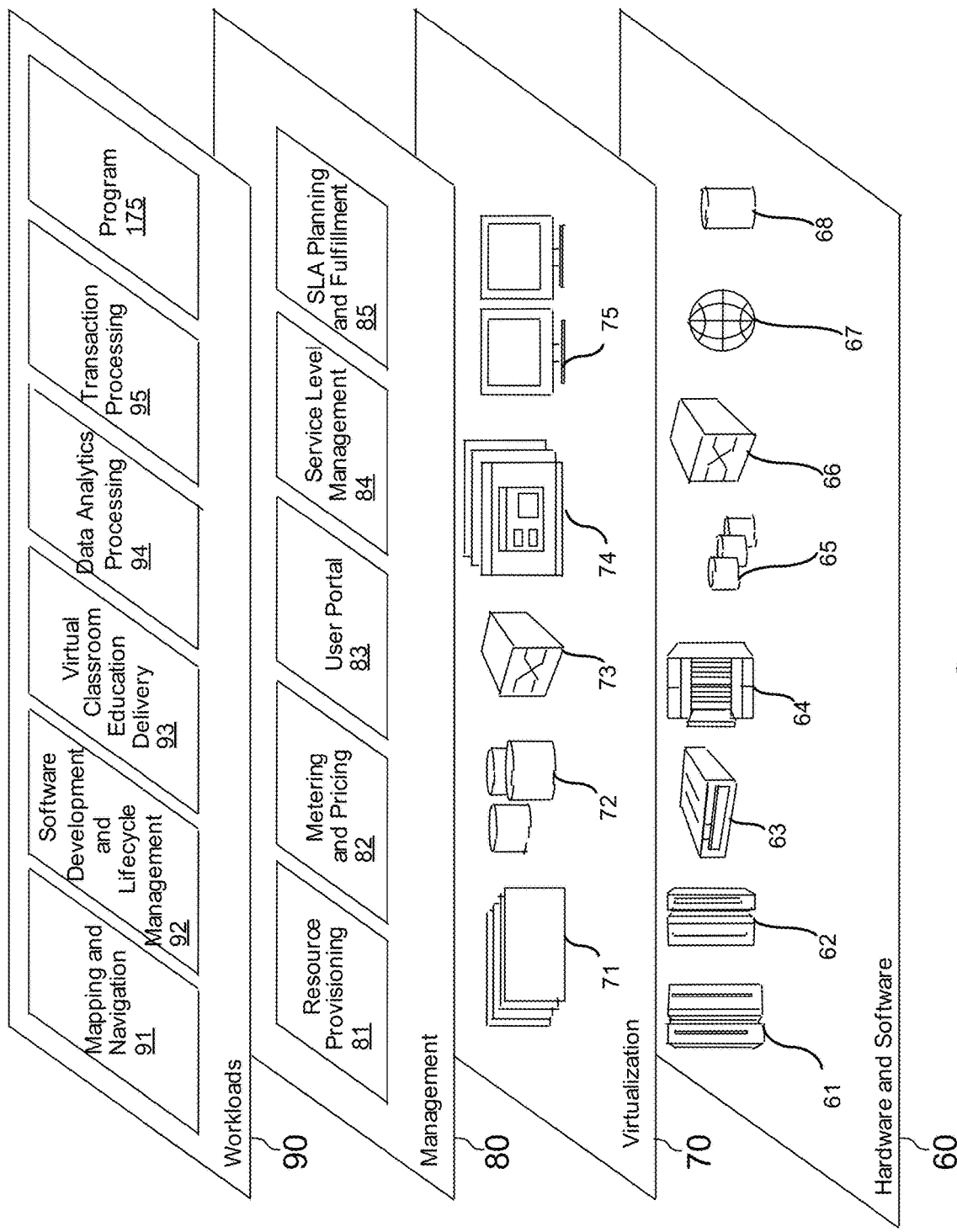
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and circuit board inspection program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for circuit board inspection, the method comprising:
  receiving, by one or more computer processors, a near infrared (NIR) image of at least a portion of a circuit board;
  analyzing, by the one or more computer processors, the NIR image using a machine learning model by:
    extracting, by the one or more computer processors, metal interconnect features from the NIR image using the machine learning model; and
    comparing, by the one or more computer processors, the metal interconnect features to a reference file of the circuit board; and
  detecting, by the one or more computer processors, anomalous circuit board portions according to the analysis.

2. The computer implemented method according to claim 1, further comprising:
  receiving, by the one or more computer processors, a visible image of the portion of the circuit board;
  registering, by the one or more computer processors, the NIR image and the visible image to each other;
  extracting, by the one or more computer processors, surface features from the visible image;
  extracting, by the one or more computer processors, metal interconnect features from the NIR image; and
  combining, by the one or more computer processors, the surface features and the metal interconnect features into a single image according to the registration of the visible image and the NIR image.

3. The computer implemented method according to claim 2, further comprising:
  comparing, by the one or more computer processors, the surface features to a bill of material of the circuit board.

4. The computer implemented method according to claim 2, further comprising:

identifying, by the one or more computer processors, a surface feature obstructing a view of a metal interconnect;

generating, by the one or more computer processors, a metal interconnect according to an inference associated with the surface feature obstructing the view; and combining, by the one or more computer processors, the generated metal interconnect, the NIR image and the visible image into a single image.

5. The computer implemented method according to claim 1, further comprising:

extracting, by the one or more computer processors, metal interconnect features from the NIR image using the machine learning model; and comparing, by the one or more computer processors, the metal interconnect features to an average NIR image of the circuit board.

6. The computer implemented method according to claim 1, further comprising generating, by the one or more computer processors, metal interconnect features according to detected metal interconnect features using a second machine learning model; and integrating, by the one or more computer processors, the generated metal interconnect feature with the NIR image.

7. A computer program product for circuit board inspection, the computer program product comprising one or more computer readable storage devices and collectively stored program instructions on the one or more computer readable storage devices, the stored program instructions comprising:

program instructions to receive a near infrared (NIR) image of at least a portion of a circuit board;

program instructions to analyze the NIR image using a machine learning model comprising:

program instructions to extract metal interconnect features from the NIR image using the machine learning model; and program instructions to compare the metal interconnect features to a reference file of the circuit board; and program instructions to detect anomalous circuit board portions according to the analysis.

8. The computer program product according to claim 7, the stored program instructions further comprising:

program instructions to receive a visible image of the portion of the circuit board;

program instructions to register the NIR image and the visible image to each other;

program instructions to extract surface features from the visible image;

program instructions to extract metal interconnect features from the NIR image; and program instructions to combine the surface features and the metal interconnect features into a single image according to the registration of the visible image and the NIR image.

9. The computer program product according to claim 8, the stored program instructions further comprising:

program instructions to compare the surface features to a bill of material of the circuit board.

10. The computer program product according to claim 8, the stored program instructions further comprising:

program instructions to identify a surface feature obstructing a view of a metal interconnect;

program instructions to generate a metal interconnect according to an inference associated with the surface feature obstructing the view; and program instructions to combine the generated metal interconnect, the NIR image and the visible image into a single image.

11. The computer program product according to claim 7, the stored program instructions further comprising:

program instructions to extract metal interconnect features from the NIR image using the machine learning model; and program instructions to compare the metal interconnect features to an average NIR image of the circuit board.

12. The computer program product according to claim 7, the stored program instructions further comprising program instructions to generate a metal interconnect feature according to detected metal interconnect features using a second machine learning model; and program instructions to integrate the generated metal interconnect feature with the NIR image.

13. A system for circuit board inspection, the system comprising:

a first camera configured to capture a near infrared (NIR) image of at least a portion of a circuit board;

one or more computer processors;

one or more computer readable storage devices; and stored program instructions on the one or more computer readable storage devices for execution by the one or more computer processors, the stored program instructions comprising:

program instructions to receive an NIR image from the first camera;

program instructions to analyze the NIR image using a machine learning model;

wherein the program instructions to analyze the NIR image comprise:

program instructions to extract metal interconnect features from the NIR image using the machine learning model; and program instructions to compare the metal interconnect features to a reference file of the circuit board; and program instructions to detect anomalous circuit board portions according to the analysis.

14. The system according to claim 13, further comprising:

a second camera configured to capture a visible image of at least the portion of the circuit board;

program instructions to register the NIR image and the visible image to each other;

program instructions to extract surface features from the visible image;

program instructions to extract metal interconnect features from the NIR image; and program instructions to combine the surface features and the metal interconnect features into a single image according to the registration of the visible image and the NIR image.

15. The system according to claim 14, further comprising:

program instructions to compare the surface features to a bill of material of the circuit board.

16. The system according to claim 13, further comprising:

program instructions to extract metal interconnect features from the NIR image using the machine learning model; and program instructions to compare the metal interconnect features to an average NIR image of the circuit board.

17. The system according to claim 13, further comprising program instructions to generate metal interconnect features according to detected metal interconnect features using a second machine learning model; and program instructions to integrate the generated metal interconnect feature with the NIR image.

* * * * *